US006789714B1

(12) United States Patent
Benson et al.

(10) Patent No.: US 6,789,714 B1
(45) Date of Patent: Sep. 14, 2004

(54) MOVABLE RACK ITEM STORAGE SYSTEM

(76) Inventors: Kerry J. Benson, 2829 NE. 38th St., #304, Ft. Lauderdale, FL (US) 33306; Ross J. Petrie, 2527 Bimini La., Ft. Lauderdale, FL (US) 33312

( * ) Notice: Subject to any disclaimer, the term of this patent is extended or adjusted under 35 U.S.C. 154(b) by 89 days.

(21) Appl. No.: 10/188,448

(22) Filed: Jul. 5, 2002

(51) Int. Cl.[7] .............................. A47F 5/08; A47F 7/00
(52) U.S. Cl. ................... 224/584; 211/70.6; 211/87.01; 211/94.02; 224/543; 224/547; 224/585
(58) Field of Search ................................ 224/543, 547, 224/584, 585, 904; 206/806; 211/70.6, 87.01, 88.01, 94.02; 296/37.8

(56) References Cited

U.S. PATENT DOCUMENTS

| | | | | | |
|---|---|---|---|---|---|
| 4,131,203 | A | * | 12/1978 | Bridges | 211/88.01 |
| 4,889,377 | A | * | 12/1989 | Hughes | 211/88.01 |
| 5,318,187 | A | * | 6/1994 | Rosenthal | 211/88.01 |
| 5,415,457 | A | * | 5/1995 | Kifer | 224/543 |
| 5,743,416 | A | * | 4/1998 | Yemini | 211/70.6 |
| 5,775,504 | A | * | 7/1998 | Menaged | 206/806 |
| 5,803,273 | A | * | 9/1998 | Menaged et al. | 211/87.01 |
| 5,915,777 | A | * | 6/1999 | Gignac et al. | 224/543 |
| 6,209,734 | B1 | * | 4/2001 | Wang | 211/87.01 |
| 6,244,486 | B1 | * | 6/2001 | Holland et al. | 224/584 |
| 6,536,611 | B2 | * | 3/2003 | Chen | 211/70.6 |

* cited by examiner

Primary Examiner—Gary E. Elkins
(74) Attorney, Agent, or Firm—Oltman, Flynn & Kubler

(57) ABSTRACT

A retaining system for several items includes several group retaining structures, each group retaining structure having an item holding structure for retaining a group of related items; a collective mounting structure including mounting rails having fasteners for fastening to a mounting surface and having rail engaging structures for releasibly engaging and supporting several of the group retaining structures so that items retained on the group retaining structures are collectively displayed and individually accessible; and a group retaining structure carrier having carrier engaging structures for releasibly engaging and supporting at least one group retaining structure, the group retaining structure carrier having a carrier handle permitting a user to grasp and carry the group retaining structure carrier and any attached group retaining structure.

16 Claims, 6 Drawing Sheets

MOVABLE RACK ITEM STORAGE SYSTEM

BACKGROUND OF THE INVENTION

1. Field of the Invention

The present invention relates generally to the field of systems for retaining and displaying hand portable items such as tools. More specifically the present invention relates to an item retaining system including a number of individually separable and transportable item group retaining structures which each retain and display a group of one or more related items, and including a collective mounting structure which releasibly mounts the item group retaining structures collectively to an upright mounting surface so that the items are collectively displayed and individually accessible. The item group retaining structures retain items grouped by function or other common characteristic. The item group retaining structures preferably each take the form of an upright panel with a panel forward face having at least one item holding structure. The collective mounting structure preferably takes the form of mounting rails fastened upright to a mounting surface such as a wall of a building or panel of a vehicle, having rail engaging means releasibly engaging and supporting several group retaining structures. The system preferably includes a group retaining structure carrier with handle means for engaging and carrying up to two group retaining structures, and for positioning the group retaining structures upright for item display.

2. Description of the Prior Art

There have long been peg boards for displaying and making accessible hand portable items such as tools, and specially designated boxes for retaining grouped items such as tools and tackle for manual transport. Problems with these common arrangements have been that when items stored in a box are needed, the specific box in which they are located must be found, the box opened and the items sorted through until the desired item is discovered. Furthermore, when several items on a pegboard are needed for a certain task, these items must be removed from the pegboard individually and carried in some fashion to the location of the task, and later replaced in their designated places on the pegboard. And, while the individual items are separated from the pegboard, they are subject to loss.

It is thus an object of the present invention to provide a movable rack item storage system for home, garden and commercial applications in which items are retained in a collective display to be visible all at once, and in which the items are retained in several item retaining structures making up the collective display, each retaining structure retaining a group of the items defined by common characteristic, such as for performing related tasks, the item retaining structures being individually removable from the collective display for manual transport to an item use site.

It is another object of the present invention to provide such a system in which group retaining structures removed from the collective display can be gripped and carried with ease such as by mounting them to a carrier.

It is still another object of the present invention to provide such a system in which group retaining structures removed from the collective display can be positioned in an upright orientation so that items on the group retaining structure can be seen all at once at a glance without opening anything.

It is finally an object of the present invention to provide such a system which is inexpensive to manufacture, versatile, durable, easy to install and easy to use.

SUMMARY OF THE INVENTION

The present invention accomplishes the above-stated objectives, as well as others, as may be determined by a fair reading and interpretation of the entire specification.

A retaining system for several items, including several separable group retaining structures, each group retaining structure having an item holding structure for transporting and displaying at least one item defining an item group for use in performing a specific task; and a collective mounting structure releasibly mounting the item group retaining structures collectively to a mounting surface.

A retaining system is further provided for several items, including several group retaining structures, each group retaining structure having an item holding structure for retaining a group of related items; a collective mounting structure including mounting rails having fasteners for fastening to a mounting surface and having rail engaging structures for releasibly engaging and supporting several of the group retaining structures so that items retained on the group retaining structures are collectively displayed and individually accessible; and a group retaining structure carrier having carrier engaging structures for releasibly engaging and supporting at least one group retaining structure, the group retaining structure carrier having a carrier handle permitting a user to grasp and carry the group retaining structure carrier and any attached group retaining structure.

The collective mounting rails preferably include elongate members with rail fastening structures for securing the mounting rails to a mounting surface; several key bolts, each key bolt having a key bolt shank and a key bolt head; threaded key bolt holes into which the key bolts are screwed so that the key bolt heads are spaced apart from the given the rail; where the mounting rails are arrayed on the mounting surface, spaced laterally apart from each other.

The mounting rails preferably also include end mounting rails, each end mounting rail including two opposing longitudinal end mounting rail ends and a key bolt hole at each longitudinal end mounting rail end fitted with a key bolt. The mounting rails preferably additionally include at least one center mounting rail for positioning between the end mounting rails, the at least one center mounting rail including two opposing longitudinal center mounting rail ends and including two laterally spaced apart key bolt holes at each longitudinal center mounting rail end fitted with key bolts; for mounting two group retaining structures side by side so that the group retaining structures extend in opposing directions from each center mounting rail.

Each item group retaining structure preferably includes a retaining panel having a panel periphery and at least one item holding structure configured to retain at least one item; and a mounting frame in the form of a loop fastened along the panel periphery and including frame key bolt ports corresponding in spacing from each other to the longitudinal spacing of the rail key bolts on each mounting rail; so that the rail key bolts fit into the frame key bolt ports and engage the mounting frame. The mounting frame preferably further includes two handle portions protruding forwardly from opposing portions of the mounting frame.

Each key bolt port preferably has a port wider end sized to pass one of the key bolt heads and has a port narrower end above the port wider end which is too small to pass one of the key bolt heads but large enough to pass one of the key bolt shanks, so that one of the key bolt heads can be passed through the port wider end and the mounting frame moved downward so that the key bolt shank passes into the port narrower end and the key bolt head cannot pass through the key bolt port and the key bolt head abuts and engages the mounting frame. Each item holding structure preferably includes one of: a retaining panel indentation for receiving an item, with a retaining strap extending across the indentation; multiple item engaging straps; and an item receiving pocket.

The group retaining structure carrier preferably includes a carrier frame including a tubular and substantially horizontal bottom frame member having bottom frame member ends with upwardly opening frame sockets, a tubular and substantially horizontal top frame member having top frame member ends with downwardly opening frame sockets, and two tubular and substantially vertical side frame members with side frame member upper ends fitted into respective downwardly opening frame sockets and lower ends fitted into respective upwardly opening frame sockets, the bottom frame member, the top frame member and the side frame members collectively defining a substantially planar carrier frame having a frame forward face and a frame rearward face, and carrier fasteners for fastening the frame members into the sockets, and key bolts having key bolt shanks and key bolt heads, the key bolts being extending from the frame forward face so that the key bolt heads are spaced forwardly from the frame forward face; and handle structure extending from the carrier frame; so that the group retaining structure carrier is capable of engaging and carrying one of the group retaining structures. The retaining system of claim preferably additionally includes several of the key bolts extending from the frame rearward face so that the key bolt heads are spaced rearwardly from the frame rearward face; so that the group retaining structure carrier is capable of engaging and carrying two of the group retaining structures, one of the group retaining structures being mounted to the frame member forward face and one of the group retaining structures being mounted to the frame member rearward face.

The key bolts preferably extend through registering key bolt holes in each of the sockets and in each the side frame members, so that the key bolts fasten the side frame members into the sockets. The handle structure preferably includes a handle protruding upwardly from the top frame member. The retaining system preferably additionally includes two substantially horizontal and spaced apart leg members rotatably mounted underneath the bottom frame member to rotate to a position perpendicular to the bottom frame member to support and stabilize the carrier as the carrier stands upright on the leg members, and to rotate to a position substantially parallel to the bottom frame member for carrier compactness for storage. The at least one leg member preferably additionally includes an upwardly extending engaging tab spaced from a corresponding upwardly opening socket a sufficient distance to receive an edge of a mounting frame of one of the group retaining structures, for preventing the given leg member from rotating out of its stabilizing position substantially perpendicular to the bottom frame member while a mounting frame is mounted onto a face of the carrier.

BRIEF DESCRIPTION OF THE DRAWINGS

Various other objects, advantages, and features of the invention will become apparent to those skilled in the art from the following discussion taken in conjunction with the following drawings, in which:

FIG. 8 is a front view of two of an end rail and a center rail mounted to an upright mounting surface, showing the preferred key bolt port and fastener hole locations.

DESCRIPTION OF THE PREFERRED EMBODIMENTS

Figure 1:
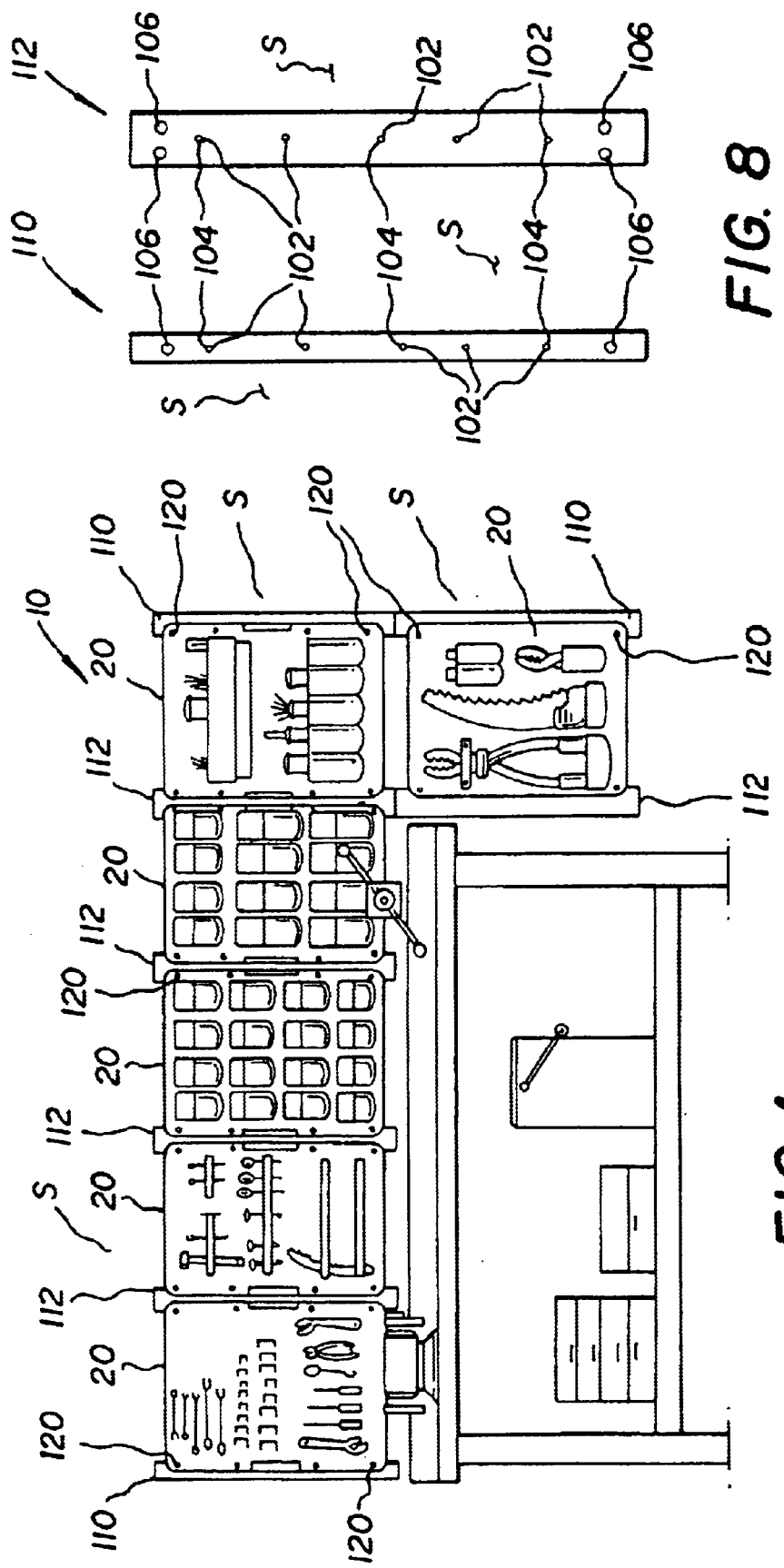
FIG. 1 is a front view of the entire preferred retaining system mounted to a building wall above a work table, and retaining items in the form of various tools.
Figure 2:
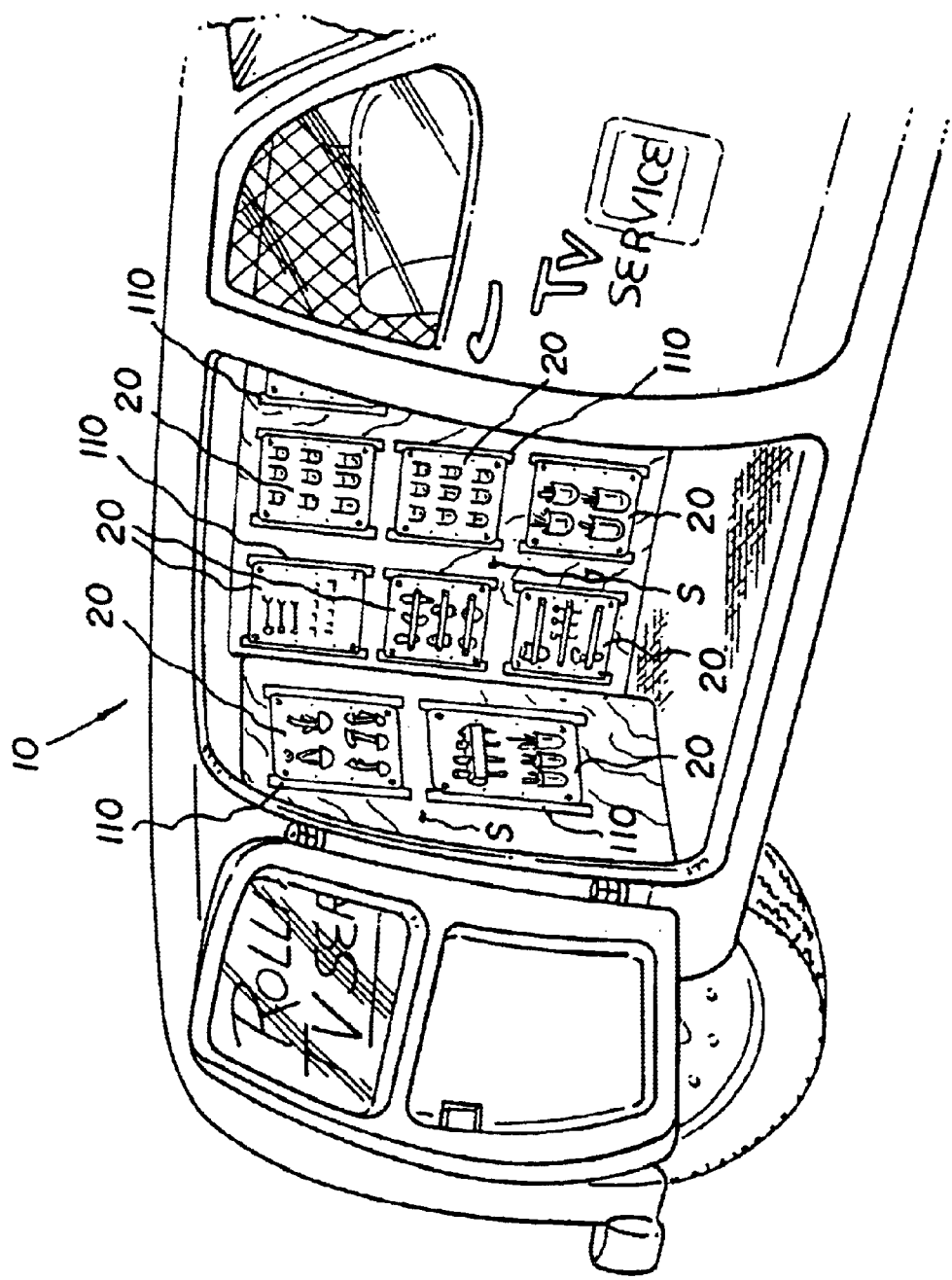
FIG. 2 is a partial perspective view of the entire preferred retaining system mounted an interior side panel of a service vehicle.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–12, a retaining system 10 for items I is disclosed, including a number of individually separable and transportable item group retaining structures 20 which retain and display a limited group of items I for use in performing specific tasks and including a collective mounting structure 100 for releasably mounting the group retaining structures 20 collectively to a mounting surface S. See FIGS. 1 and 2. The item group retaining structures 20 each retain items I grouped by function or other common characteristic. See FIG. 3.

Figure 5:
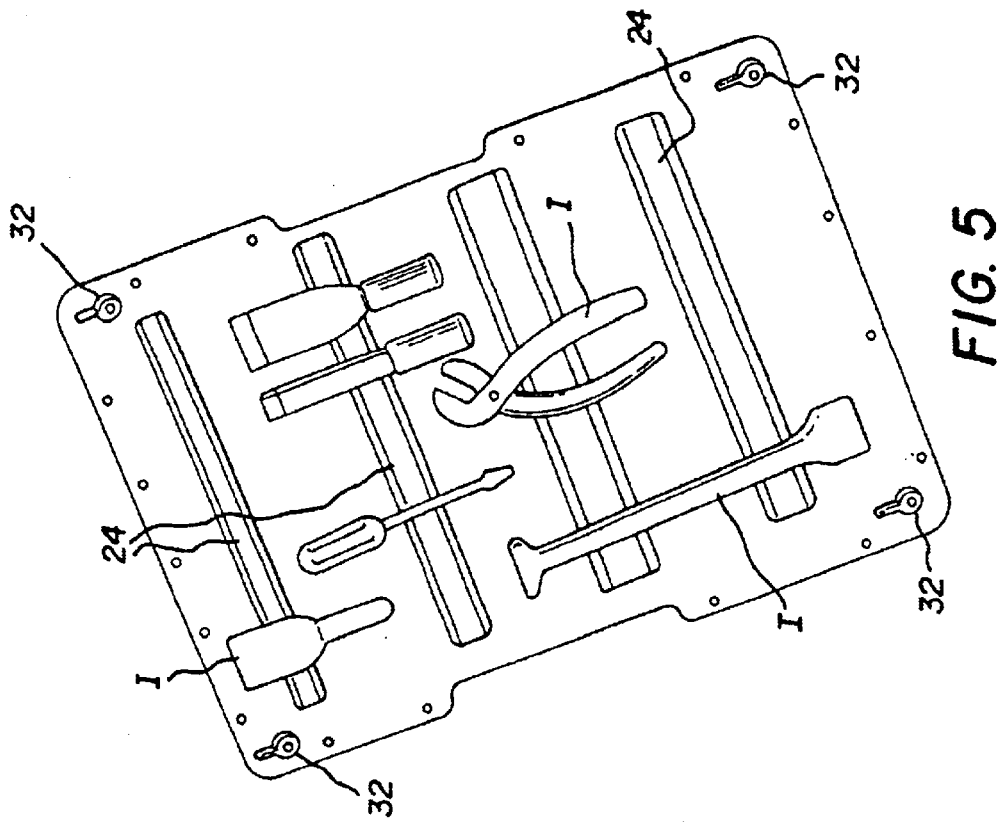
FIG. 5 shows a retaining panel having parallel strap item holding structures.
Figure 3:
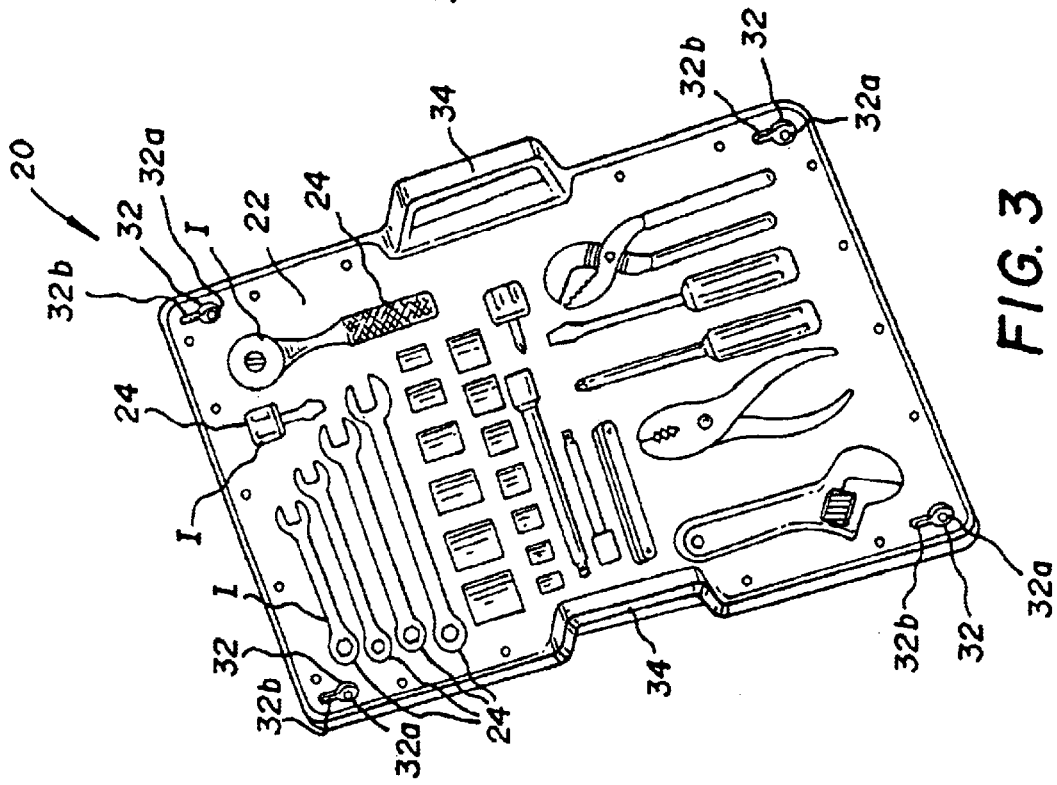
FIG. 3 is a perspective view of one of the preferred item group retaining structures making up the system.
Figure 4:
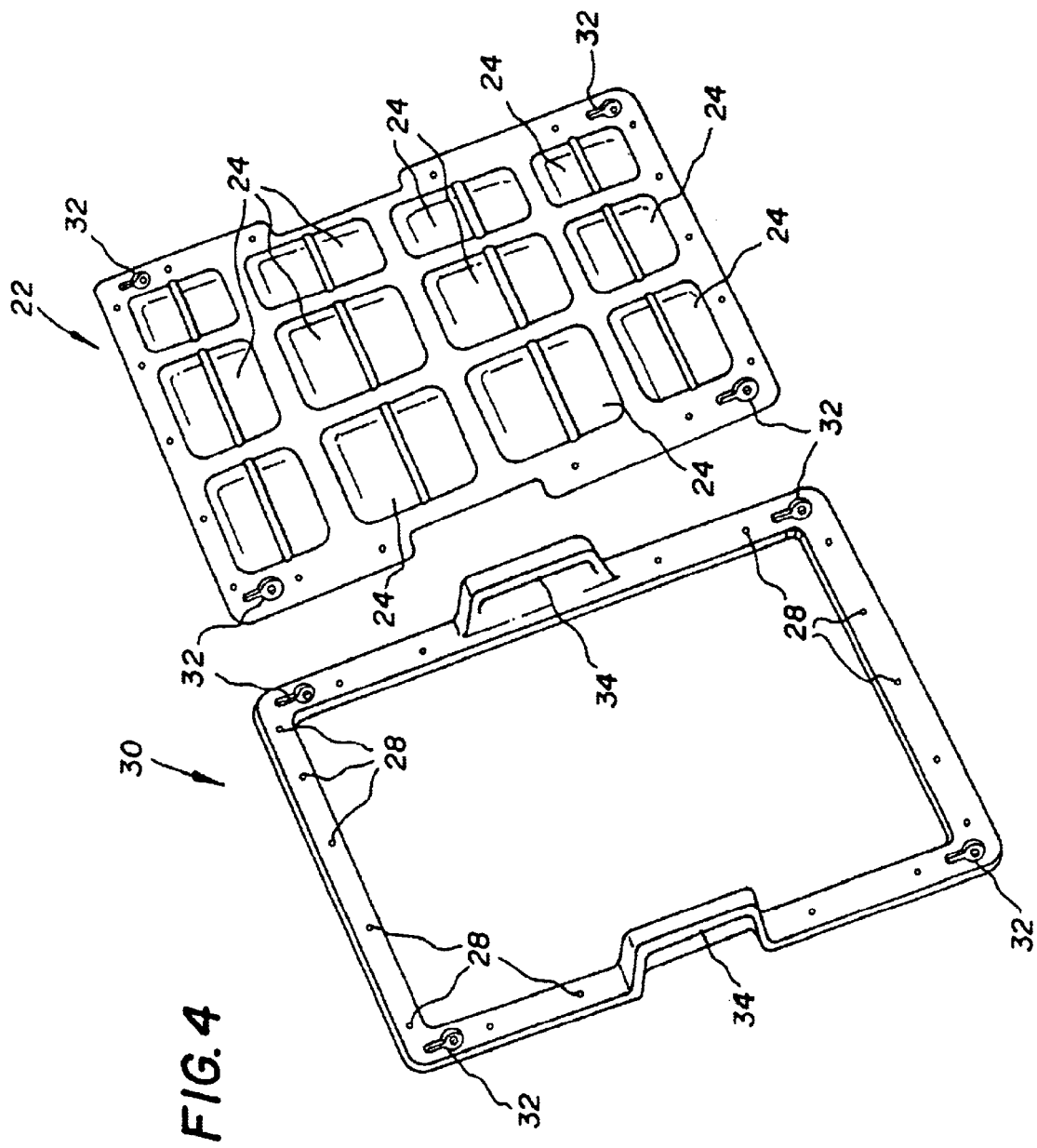
FIG. 4 is an exploded view of an item group retaining structure showing the mounting frame separated from the retaining panel.
Figures 6, 7:
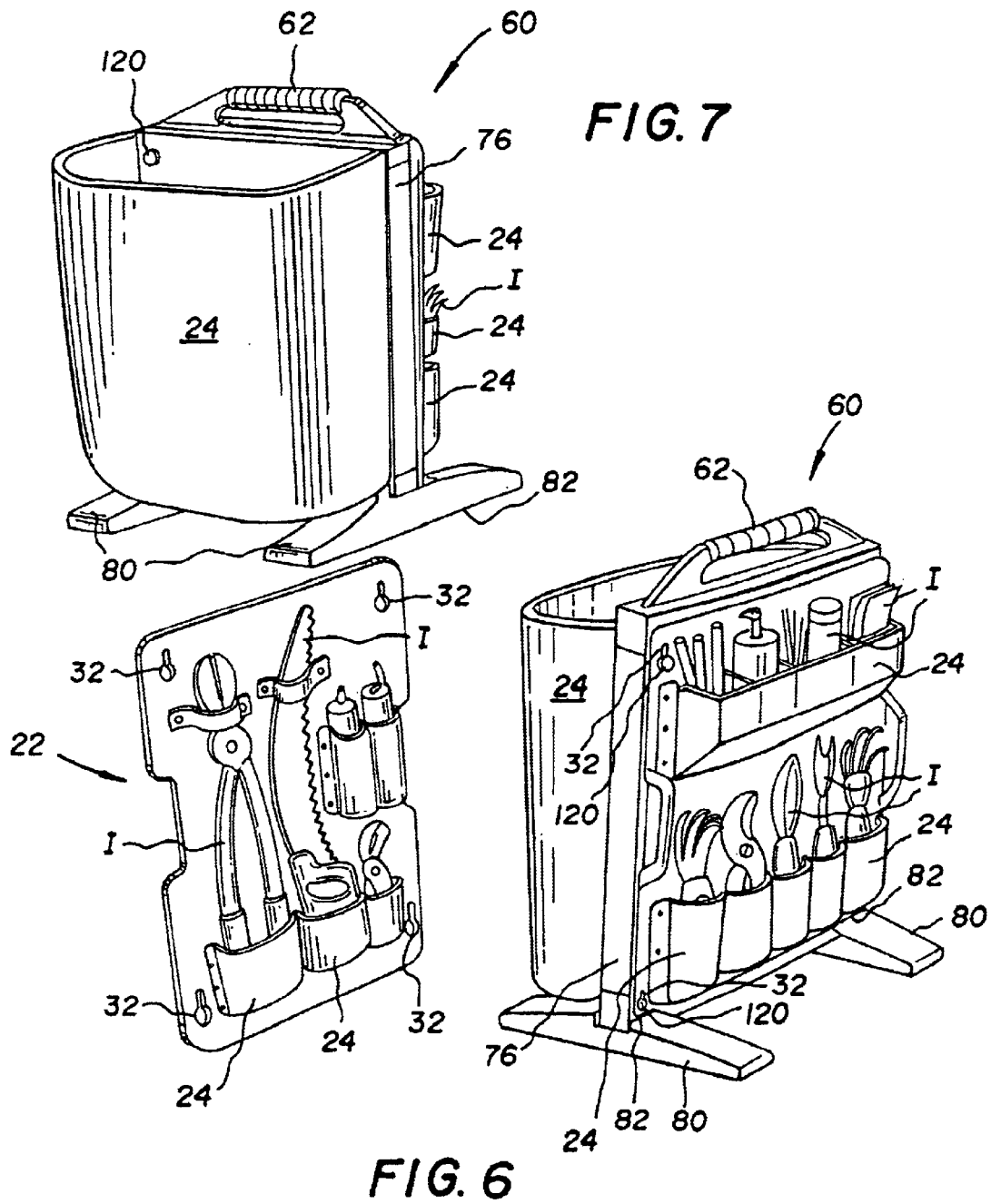
FIG. 6 is a perspective view of two item group retaining structures mounted to front and real faces of a group retaining carrier, the forward item group retaining structure having item holding structures in the form of several item pockets.
FIG. 7 is a perspective view of the two item group retaining structures mounted to front and real faces of the group retaining carrier of FIG. 6, the forward item group retaining structure having an item holding structure in the form of a single item pocket, and of a separate item group retaining structure adjacent to the carrier.
Figure 9:
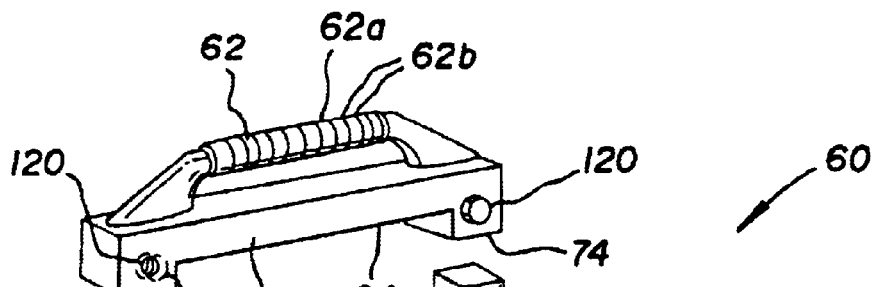
FIG. 9 is an exploded perspective view of the preferred group retaining structure carrier, showing the carrier frame elements and carrier leg members.
Figure 10:
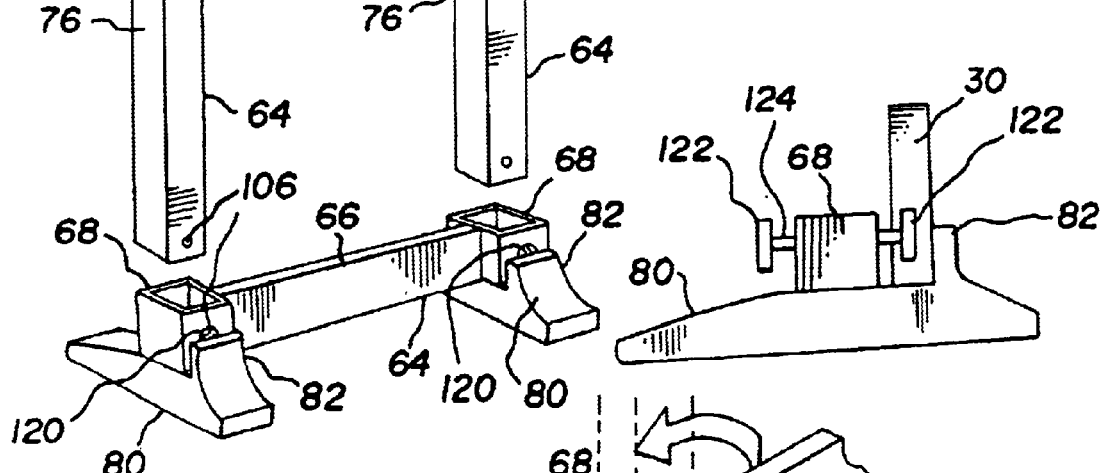
FIG. 10 is a side view of the carrier bottom frame member and carrier leg member, with a partial view of a group mounting structure mounting frame fitted between an upwardly opening socket and a leg member engaging tab, locking the leg member against rotation out of its perpendicular stabilizing position while the group retaining structure is mounted on the carrier.
Figure 11:
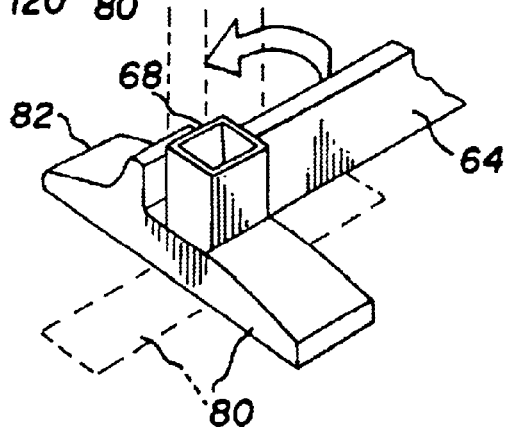
FIG. 11 is an upper perspective view of the bottom frame member and carrier leg member of FIG. 10, with a side frame member shown in broken lines and the leg member shown rotated into its parallel storage position in broken lines.
Figure 12:
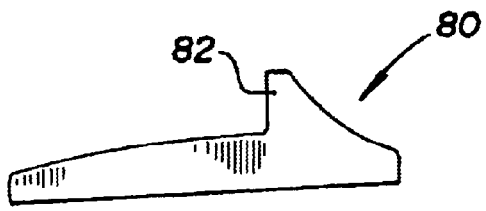
FIG. 12 is a side view of the preferred carrier leg member.

Each item group retaining structure 20 preferably includes a retaining panel 22 having at least one item holding structure 24 configured to retain at least one specific type of item I. An item holding structure 24 may take the form of a retaining panel indentation for receiving an item I, with a retaining strap extending across the indentation and item, as shown in FIG. 4, or may take the form of multiple item engaging straps only, as shown in FIG. 5, or multitude pockets, as shown in FIG. 6, or a single large pocket, as shown in FIG. 7, or any other suitable or desired configuration. A universal mounting frame 30, preferably in the form of a first rectangular loop, is fastened along the periphery of each retaining panel 22 such as with rivets at mounting frame fastener holes 28, each mounting frame 30 including frame key bolt ports 32 for receiving key bolts 120. Key bolts 120 each have a key bolt head 122 and a threaded key bolt shank 124. The mounting frame 30 preferably further includes two handle portions 34 protruding forwardly from opposing upright sides of the mounting frame 30. See FIGS. 3 and 4. Each key bolt port 32 has a port wider end 32a sized to pass the head of a key bolt 120 and has a port narrower end 32a above the port wider end 32a which is too small to pass the key bolt head 122 but large enough to pass the key bolt shank 124, so that the head of a key bolt 120 can be passed through the port wider end 32a and the mounting frame 30 moved downward so that the shank 124 of the key bolt 120 passes into the port narrower end 32b and key bolt head 122 cannot pass through the port 32 and the key bolt head 122 abuts and engages the mounting frame 30.

The collective mounting structure 100 takes the form of mounting rails 110 and 112 fastened upright to a mounting surface S such as a wall of a building or panel of a vehicle, having rail engaging means releasibly engaging and supporting several group retaining structures 20 so that the items I retained on the several group retaining structures 20 are collectively displayed and individually accessible. See FIG. 8.

A group retaining structure carrier 60 preferably is provided having carrier engaging means for releasibly engaging and supporting up to two group retaining structures 20 and providing a carrier handle 62 for grasping and carrying the carrier 60 and any attached group retaining structures 20, and for positioning the group retaining structures 20 upright for item I display.

Mounting rails 110 and 112 preferably are elongate members with rail fastener holes 102 through which rail fasteners 104 such as screws or nails pass and secure the mounting rails 110 and 112 to a mounting surface S. The mounting rails 110 and 112 also include threaded key bolt holes 106 into which key bolts 120 are screwed so that the head 122 of each key bolt 120 is spaced apart from the rail 110 or 112. The key bolts 120 are spaced from each other to correspond to the spacing of key bolts ports 32 in mounting frames 30. The mounting rails 110 and 112 preferably are arrayed in parallel series, including an end mounting rail 110 at each end of each series, the end mounting rails 110 each including a key bolt hole 106 centered at each longitudinal rail end and fitted with a key bolt 120 as described above, and including several fastener holes 102 between the key bolt holes. Center mounting rails 112 are provided between end mounting rails 110 in each series, the center mounting rails 112 being wider than end mounting rails 110 and including two laterally spaced apart key bolt holes 106 at each rail end fitted with key bolts 120, for mounting two structures 20 side by side so that the group retaining structures 20 extend in opposing directions from the center mounting rail 112, and including several fastener holes 102 between the key bolt holes 106.

The group retaining structure carrier 60 preferably includes a carrier frame 64 in the form of a peripheral loop which in this embodiment is rectangular. See FIG. 9. The carrier frame 64 preferably is made up of a horizontal bottom frame member 66 having upwardly opening frame sockets 68 at each end, a tubular horizontal top frame member 72 having downwardly opening frame sockets 74 at each end, and two tubular vertical side frame members 76 with upper ends fitted into respective downwardly opening frame sockets 74 and lower ends fitted into respective upwardly opening frame sockets 68. The upwardly and downwardly opening frame sockets 68 and 74, respectively, have key bolt holes 106 at carrier 60 forward and rearward faces and the side frame members 76 have registering and threaded key bolt holes 106, and key bolts 120 are screwed into these registering key bolt holes 106 so that the key bolt heads 122 are spaced outwardly from the sockets 68 and 74 to receive and engage a group retaining structure 20 as above described. As a result, the group retaining structure carrier 60 can engage and carry one group retaining structure 20 or two group retaining structures 20 on front and back faces of the carrier 60. The top frame member 72 preferably includes the carrier handle means in the form of an upwardly protruding carrier handle 62 having a cylindrical gripping bar 62a which preferably includes two opposing longitudinal series of gripping notches 62b.

The bottom frame member 66 preferably includes two elongate, horizontal leg members 80 rotatably mounted to the lower surface of each end of the bottom frame member 66 so that the leg members 80 can be rotated to a position perpendicular to the bottom frame member 66 to stabilize the carrier 60 to stand upright, and can be rotated to a position substantially parallel to bottom frame member 66 to make the carrier 60 flatter and thus more compact for storage. See FIGS. 11 and 12. The leg members 80 preferably each include an upwardly extending engaging tab 82 which is spaced from one of the upwardly opening sockets 68 a sufficient distance to permit a mounting frame to fit between the socket 68 and the engaging tab 82. The engaging tab 82 prevents the leg member 80 from rotating out of its stabilizing perpendicular position while a mounting frame 30 is mounted onto a face of the carrier 60.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A retaining system for a plurality of items, comprising:
   a plurality of group retaining structures, each said group retaining structures having item holding means for retaining a group of related items;
   a collective mounting structure comprising mounting rails having fastening means for fastening to a mounting surface and having rail engaging means for releasibly engaging and supporting several said group retaining structures such that items retained on said group retaining structures are collectively displayed and individually accessible;

and a group retaining structure carrier having carrier engaging means for releasibly engaging and supporting at least one said group retaining structure, said group retaining structure carrier having a carrier handle permitting a user to grasp and carry said group retaining structure carrier and any attached said group retaining structure.

2. The retaining system of claim 1, wherein said collective mounting rails comprise:
   elongate members with rail fastening means for securing said mounting rails to a mounting surface;
   a plurality of key bolts, each said key bolt having a key bolt shank and a key bolt head,
   threaded key bolt holes into which said key bolts are screwed such that said key bolt heads are spaced apart from the given said rail;
   wherein said mounting rails are arrayed on the mounting surface, spaced lateral apart from each other.

3. The retaining system of claim 1, wherein said mounting rails comprise end mounting rails, each said end mounting rail comprising two opposing longitudinal end mounting rail ends and a key bolt hole at each said longitudinal end mounting rail end fitted with a key bolt.

4. The retaining system of claim 3, wherein said mounting rails additionally comprise at least one center mounting rail for positioning between said end mounting rails, said at least one center mounting rail comprising two opposing longitudinal center mounting mil ends and comprising two laterally spaced apart key bolt holes at each said longitudinal center mounting rail end fitted with key bolts;
   for mounting two said group retaining structures side by side such that said group retaining structures extend in opposing directions from each said center mounting rail.

5. The ret system of claim 2, wherein each said item group retaining structure comprises:
   a retaining panel having a panel periphery and at least one item holding structure configured to retain at least one item;
   and a mounting frame in the form of a loop fastened along said panel periphery and comprising frame key bolt ports corresponding in spacing from each other to the longitudinal spacing of said rail key bolts on each said mounting rail;
   such that said rail key bolts fit into said frame key bolt ports and engage said mounting frame.

6. The retaining system of claim 5, wherein said mounting frame further comprises two handle portions protruding forwardly from opposing portions of said mounting frame.

7. The retaining system of claim 2, wherein each said key bolt port has a port wider end sized to pass one said key bolt head and has a port narrower end above said port wider end which is too small to pass said key bolt head but large enough to pass one said key bolt shank, such that one of said key bolt heads can be passed through said port wider end and said mounting frame moved downward such that said key bolt shank passes into said port narrower end and said key bolt head cannot pass through said key bolt port and said key bolt head abuts and engages said mounting frame.

8. The retaining system of claim 5, wherein each said item holding structure comprises a retaining panel indentation for receiving an item with a retaining strap extending across said indentation.

9. The retaining system of claim 5, wherein each said item holding structure comprises multiple item engaging straps.

10. The retaining system of claim 5, wherein each said item holding structure comprises an item receiving pocket.

11. The retaining system of claim 1, wherein said group retaining structure carrier comprises:
   a carrier frame comprising a tubular and substantially horizontal bottom frame member having bottom frame member ends with upwardly opening frame sockets, a tubular and substantially horizontal top frame member having top frame member ends with downwardly opening frame sockets, and two tubular and substantial vertical side frame members with side frame member upper ends fitted into respective said downwardly opening frame sockets and lower ends fitted into respective said upwardly opening frame sockets, said bottom frame member, said top frame member and said side frame members collectively defining a substantially planar carrier frame having a frame forward face and a frame rearward face, and carrier fastener means for fastening said frame members into said sockets, and key bolts having key bolt shanks and key bolt heads, said key bolts being extending from said frame forward face such that said key bolt heads are spaced forwardly from said frame forward face; and handle means extending from said carrier frame;
   such that said group retaining structure carrier is capable of engaging and carrying one of said group retaining structures.

12. The retaining system of claim 11, additionally comprising a plurality of said key bolts extending from said frame rearward face such that said key bolt heads are spaced rearwardly from said frame rearward face;
   such that said group retaining structure carrier is capable of engaging and carrying two of said group retaining structures, one said group retaining structure being mounted to said frame member forward face and one said group retaining structure being mounted to said frame member rearward face.

13. The retaining system of claim 11, wherein said key bolts extend through registering key bolt holes in each said socket and in each said side frame member, such that said key bolts fasten said side frame members into said sockets.

14. The retaining system of claim 11, wherein said handle means comprises a handle protruding upwardly from said top frame member.

15. The retaining system of claim 11, additionally comprising two substantially horizontal and spaced apart leg members rotatably mounted underneath said bottom frame member to rotate to a position perpendicular to said bottom frame member to support and stabilize said carrier as said carrier stands upright on said leg members, and to rotate to a position substantially parallel to said bottom frame member for carrier compactness for storage.

16. The retaining system of claim 15, wherein at least one said leg member comprises an upwardly extending engaging tab spaced from a corresponding said upwardly opening socket a sufficient distance to receive an edge of a mounting frame of one of said group retaining structures, for preventing the given said bottom member from rotating out of its stabilizing position substantially perpendicular to said bottom frame member while a mounting frame is mounted onto a face of said carrier.

* * * * *